United States Patent
Leber

(10) Patent No.: US 11,255,653 B2
(45) Date of Patent: Feb. 22, 2022

(54) METHOD FOR OPERATING A SURFACE MEASUREMENT APPARATUS

(71) Applicant: JENOPTIK Industrial Metrology Germany GmbH, Villingen-Schwenningen (DE)

(72) Inventor: Adelbert Leber, Königsfeld (DE)

(73) Assignee: JENOPTIK Industrial Metrology Germany GmbH, Villingen-Schwenningen (DE)

( * ) Notice: Subject to any disclaimer, the term of this patent is extended or adjusted under 35 U.S.C. 154(b) by 108 days.

(21) Appl. No.: 16/718,883

(22) Filed: Dec. 18, 2019

(65) Prior Publication Data

US 2020/0200519 A1    Jun. 25, 2020

(30) Foreign Application Priority Data

Dec. 19, 2018   (DE) .................. 10 2018 132 912.1
Feb. 28, 2019   (DE) .................. 10 2019 105 059.6

(51) Int. Cl.
    *G01D 21/00*   (2006.01)
    *G01B 5/20*    (2006.01)
    *G01B 5/28*    (2006.01)

(52) U.S. Cl.
    CPC ........... *G01B 5/20* (2013.01); *G01B 5/28* (2013.01)

(58) Field of Classification Search
    CPC .................................. G01B 5/20; G01B 5/28
    USPC ........................................................ 33/556
    See application file for complete search history.

(56) References Cited

U.S. PATENT DOCUMENTS

| 4,503,616 A  * | 3/1985  | Pullen ................ G01B 7/001 |
|                |         |                          33/558   |
| 5,131,166 A  * | 7/1992  | Weber ................. G01B 5/004 |
|                |         |                          33/1 M   |
| 7,284,337 B2 * | 10/2007 | Brenner .............. G01B 7/012  |
|                |         |                          33/503   |
| 8,334,971 B2   | 12/2012 | Keller et al.                     |
| 8,336,224 B2   | 12/2012 | Arnold                            |
| 8,429,829 B2   | 4/2013  | Arnold                            |
| 8,508,743 B2   | 8/2013  | Keller et al.                     |
| 8,725,446 B2   | 5/2014  | Wegmann                           |
| 8,973,280 B2   | 3/2015  | Seewig                            |
| 9,261,359 B2   | 2/2016  | DeCool                            |
| 9,393,663 B2   | 7/2016  | Volk                              |
| 9,395,310 B2   | 7/2016  | Rudolf                            |
| 9,562,756 B2   | 2/2017  | Seewig                            |

(Continued)

*Primary Examiner* — George B Bennett
(74) *Attorney, Agent, or Firm* — Shlesinger, Arkwright & Garvey, LLP

(57) ABSTRACT

A method for operating a surface measuring apparatus for measuring a surface of a workpiece. Method includes operating surface measuring apparatus having a probe that includes a probe arm that is deflectable by an angle about a swivel axis, and that on its end facing away from the swivel axis bears a probe element. Probe is movable relative to a base body of surface measuring apparatus along a linear axis. In method, a workpiece is contacted by moving the probe along the linear axis by use of the probe element, and after workpiece is contacted, probe arm is moved by a specified travel distance along the linear axis. The resulting angular deflection of the probe arm about the swivel axis is measured, and based on the specified travel distance and measured angular deflection of the probe arm, the probe arm is classified with regard to its length.

18 Claims, 2 Drawing Sheets

(56) References Cited

U.S. PATENT DOCUMENTS

| | | | |
|---|---|---|---|
| 9,683,914 B2 | 6/2017 | Dietz et al. | |
| 9,816,811 B2 | 11/2017 | Riester | |
| 9,879,969 B2 | 1/2018 | Volk | |
| 9,933,277 B2 * | 4/2018 | Terauchi | G01D 5/04 |
| 9,983,149 B2 | 5/2018 | Rudolf | |
| 10,330,915 B2 | 6/2019 | Rudolf | |
| 10,408,597 B2 | 9/2019 | Volk | |
| 10,480,965 B2 | 11/2019 | Volk | |
| 2011/0173829 A1 * | 7/2011 | Pettersson | G01C 15/02 33/503 |
| 2015/0153149 A1 * | 6/2015 | Pettersson | G01B 7/008 33/503 |
| 2015/0168121 A1 * | 6/2015 | Tait | G01B 5/008 33/503 |
| 2016/0116276 A1 * | 4/2016 | Featherstone | G01B 5/012 33/503 |

\* cited by examiner

METHOD FOR OPERATING A SURFACE MEASUREMENT APPARATUS

CROSS-REFERENCE TO RELATED APPLICATIONS

This application claims the priority of German Application No. 10 2018 132 912.1, filed Dec. 19, 2018, and this application claims the priority of German Application No. 10 2019 105 059.6, filed Feb. 28, 2019, and each of which is incorporated herein by reference.

FIELD OF THE INVENTION

The invention relates to a method for operating a surface measuring apparatus.

BACKGROUND OF THE INVENTION

Surface measuring apparatuses of this type are generally known, for example in the form of roughness measurement apparatuses, and are used in particular in industrial production measurement technology. They have a probe that includes a probe arm that is deflectable by an angle about a swivel axis, and that on its end facing away from the swivel axis bears a probe element, the probe being movable relative to a base body of the surface measuring apparatus along a linear axis. The known surface measuring apparatuses also have an evaluation apparatus that is designed and programmed in such a way that angular deflections of the probe arm while sampling the surface of the workpiece are converted into measured values that represent the shape of the surface of the workpiece, and have a control apparatus for controlling the measuring operation.

In the known surface measuring apparatuses, the probe arm is exchangeable for adaptation to different measuring tasks, wherein probe arms having different lengths may be used, and the length of the probe arm defines the measuring range of the probe, and thus, of the surface measuring apparatus.

To make it particularly easy to exchange the probe arm, the probe arm may be connected to the probe via a magnetic coupling, for example.

Since a certain measuring range of the surface measuring apparatus is associated with each probe arm of a certain length, after the probe arm is exchanged it is necessary to adjust the measuring range corresponding to the probe arm that is used.

It is known for an operator to manually adjust the measuring range in the software of the evaluation apparatus of the surface measuring apparatus after the probe arm is changed. If the operator forgets to adjust the measuring range or makes an incorrect measuring range adjustment, the measured values of the measurements subsequently carried out are incorrect, which may possibly not be noticed. In addition, there is the risk that for automated measuring procedures, an incorrect adjustment of the measuring range may result in the desired measuring position not being reached, resulting in a collision of the probe arm or probe with the workpiece. In that case, there is a risk of damage to the surface measuring apparatus.

It is also known to automatically change the probe arm. However, such automated devices are complicated and costly to manufacture.

Furthermore, it is known to provide exchangeable probe arms having an identification means, for example in the form of an RFID chip, so that after the probe arm is changed, the probe arm in use may be automatically recognized, and the measuring range of the surface measuring apparatus may be appropriately adjusted. A disadvantage in this regard is that the identification means makes the probe arm more expensive. In addition, for probe arms for roughness measurement apparatuses, for example, due to their small size, there is not enough room to attach an identification means to the probe arm, so then automatic recognition of the probe arm is not possible.

OBJECTS AND SUMMARY OF THE INVENTION

An object of the invention is to provide a method for operating a surface measuring apparatus that avoids incorrect measurements.

This object is achieved by the invention set forth herein.

The underlying concept of the invention is to carry out automatic recognition of the length of the probe arm, and thus, automatic adjustment of the associated measuring range, without the need for additional hardware.

The invention makes skillful use of the fact that, due to the design of the surface measuring apparatus, in which the probe arm on one end bears a probe element and in the area of its other end is supported so as to be deflectable by an angle about a swivel axis, when the probe moves by a specified travel distance along the linear axis, different lengths of the probe arm result in different angular deflections of the probe arm about the swivel axis. On this basis, the invention provides that in the method according to the invention a) a workpiece is contacted by moving the probe along the linear axis by the probe element,
b) after the workpiece is contacted, the probe together with the probe arm is moved by a specified travel distance along the linear axis,
c) the resulting angular deflection of the probe arm about the swivel axis is measured, and
d) based on the specified travel distance and the measured angular deflection of the probe arm, the probe arm is classified with regard to its length.

Thus, according to the invention, after the workpiece is contacted, the probe is moved by a specified travel distance relative to the workpiece along the linear axis, which is the z axis, for example, and which may be defined by a measuring column of the surface measuring apparatus. The travel distance may be measured by a distance measuring system, which for surface measuring apparatuses is generally provided on the measuring column anyway.

Moving the probe, and thus the probe arm, along the linear axis results in an angular deflection of the probe arm about the swivel axis, which is recorded by the evaluation apparatus. For a predefined linear movement of the swivel axis corresponding to the specified travel distance, for probe arms of different lengths a different angular deflection (angular change) about the swivel axis occurs. The invention makes use of this fact in order to classify the particular probe arm used, according to its length. For example and in particular, according to the invention it is possible on this basis to automatically adjust the associated measuring range of the surface measuring apparatus.

The method that is carried out in this way for automatic recognition of the probe arm may take place automatically via control by the control apparatus after a probe arm is changed. It is also possible to carry out the automatic recognition of the probe arm before each measurement, for example and in particular immediately after contacting the workpiece.

One particular advantage of the method according to the invention is that the automatic recognition of the probe arm (length) requires no additional hardware, and instead is possible only using the hardware that is present anyway.

The invention thus provides a novel and advantageous functionality for surface measuring apparatuses without additional costs for hardware.

The automatic recognition of the probe arm (length) according to the invention makes manual adjustment of the measuring range by an operator unnecessary when, based on the classification of the probe arm that has been made, the length of the measuring range of the measuring apparatus is automatically adjusted. This saves time and costs.

Measuring errors resulting from an incorrect adjustment of the measuring range may be reliably avoided due to the fact that according to the invention, automatic recognition of the probe arm (length) takes place, and accordingly, after the automatic recognition of the probe arm (length), the measuring range associated with the probe arm in question may be automatically adjusted. This increases the measuring accuracy as well as the productivity when carrying out measurements by means of the surface measuring apparatus according to the invention.

In applying the basic concept of the invention, even further functionalities may be achieved for a surface measuring apparatus.

Thus, for example, it is possible to conduct functional testing of the probe, for example a roughness probe. For this purpose, after the surface of a workpiece is contacted, the probe is moved along the linear axis in such a way that the entire measuring range of the roughness probe is "traveled through." The signal pattern of the measured value is observed in comparison to the associated linear travel distance (change in height of the probe along the z axis). In this way it may be determined whether the pattern of the measuring signal is constant as a function of the travel distance of the probe along the linear axis. For a constant pattern, it is ensured that the probe is mechanically functioning, i.e., for example, the probe bearing is not getting caught.

A further functionality involves checking the linearity of the probe by once again "traveling through" the measuring range of the probe and determining whether a linear travel distance results in a linear increase in the probe output signal.

One advantageous further embodiment of the method according to the invention provides that in step d)

d1) the length of the probe arm is calculated from the specified travel distance and the measured resulting angular deflection of the probe arm; and d2) the classification of the probe arm is made by comparing the calculated length of the probe arm to the lengths of predefined probe arms.

Since relatively few probe arms with previously known, greatly differing lengths are generally available, it is sufficient to perform the calculation of the length of the probe arm with a relatively low accuracy.

The method according to the invention may be used to check a selection of the probe arm length made by an operator of the surface measuring apparatus. According to the invention, it is also possible for the determined probe arm length to be displayed to and confirmed by an operator of the surface measuring apparatus. One extremely advantageous further embodiment of the invention provides that a measuring range of the surface measuring apparatus is automatically adjusted according to the classification of the probe arm with regard to its length. In this embodiment, the adjustment of the measuring range of the surface measuring apparatus takes place automatically, so that measuring errors based on an incorrect adjustment of the measuring range by an operator are reliably avoided.

The surface measuring apparatus that is operated using the method according to the invention may be any given surface measuring apparatus, depending on the particular requirements. In this regard, one advantageous further embodiment of the invention provides that the surface measuring apparatus is a roughness measurement apparatus, a contour measurement apparatus, or a shape measurement apparatus. The invention is particularly suited for roughness measurement apparatuses, since the probe arms of roughness measurement apparatuses, due to their small dimensions, frequently do not allow attachment of an identification means, for example in the form of an RFID chip, thus ruling out automatic probe arm recognition using such an identification means.

Another advantageous further embodiment provides that the linear axis is a vertical axis, and according to another further embodiment, the linear axis is defined by a measuring column of the surface measuring apparatus.

According to another advantageous further embodiment of the invention, the probe is a tactile probe.

Another advantageous further embodiment of the invention provides that the probe is connected to the base body of the surface measuring apparatus by means of a feed apparatus, and the feed apparatus defines a linear feed axis, wherein an inclination of the linear feed axis relative to the horizontal is determined and is included in the classification of the probe arm with regard to its length. This embodiment is based on the finding that a projection of the probe measured value that is a function of the inclination of the feed axis results from a nonhorizontal orientation of the linear feed axis of the feed apparatus. The inclination of the feed axis may be taken into account by using a motorized tilting apparatus. However, the inclination of the feed axis may also be taken into account by an inclination sensor that is provided in the feed apparatus.

A surface measuring apparatus according to the invention for measuring a surface of a workpiece during a measuring operation is set forth in Claim 10. The surface measuring apparatus has a base body and a probe that includes a probe arm that is deflectable by an angle about a swivel axis, and that on its end facing away from the swivel axis bears a probe element for sampling the surface of the workpiece, the probe being movable relative to the base body of the surface measuring apparatus along a linear axis. The surface measuring apparatus according to the invention also has an evaluation apparatus that is designed and programmed in such a way that angular deflections of the probe arm while sampling the surface of the workpiece are converted into measured values that represent the shape of the surface of the workpiece, and has a control apparatus for controlling the measuring operation. According to the invention, the control apparatus is designed and programmed in such a way that a) a workpiece is contacted by moving the probe along the linear axis by means of the probe element;

b) after the workpiece is contacted, the probe together with the probe arm is moved by a specified travel distance along the linear axis;

c) the resulting angular deflection of the probe arm about the swivel axis is measured; and d) based on the specified travel distance and the measured angular deflection of the probe arm, the probe arm is classified with regard to its length.

Advantageous and useful further embodiments of the surface measuring apparatus according to the invention are set forth in Claims 11 through 18. These correspondingly result in the same advantages and properties as the method according to the invention and its further embodiments.

The invention is explained in greater detail below based on one embodiment, with reference to the appended schematic drawings. All features that are described, illustrated in the drawings, and claimed in the patent claims, alone or in any suitable combination, constitute the subject matter of the invention, independently of the patent claims, and independently of their description or illustration in the drawings.

Relative terms such as left, right, up, and down are for convenience only and are not intended to be limiting.

DETAILED DESCRIPTION OF THE INVENTION

Figure 1:
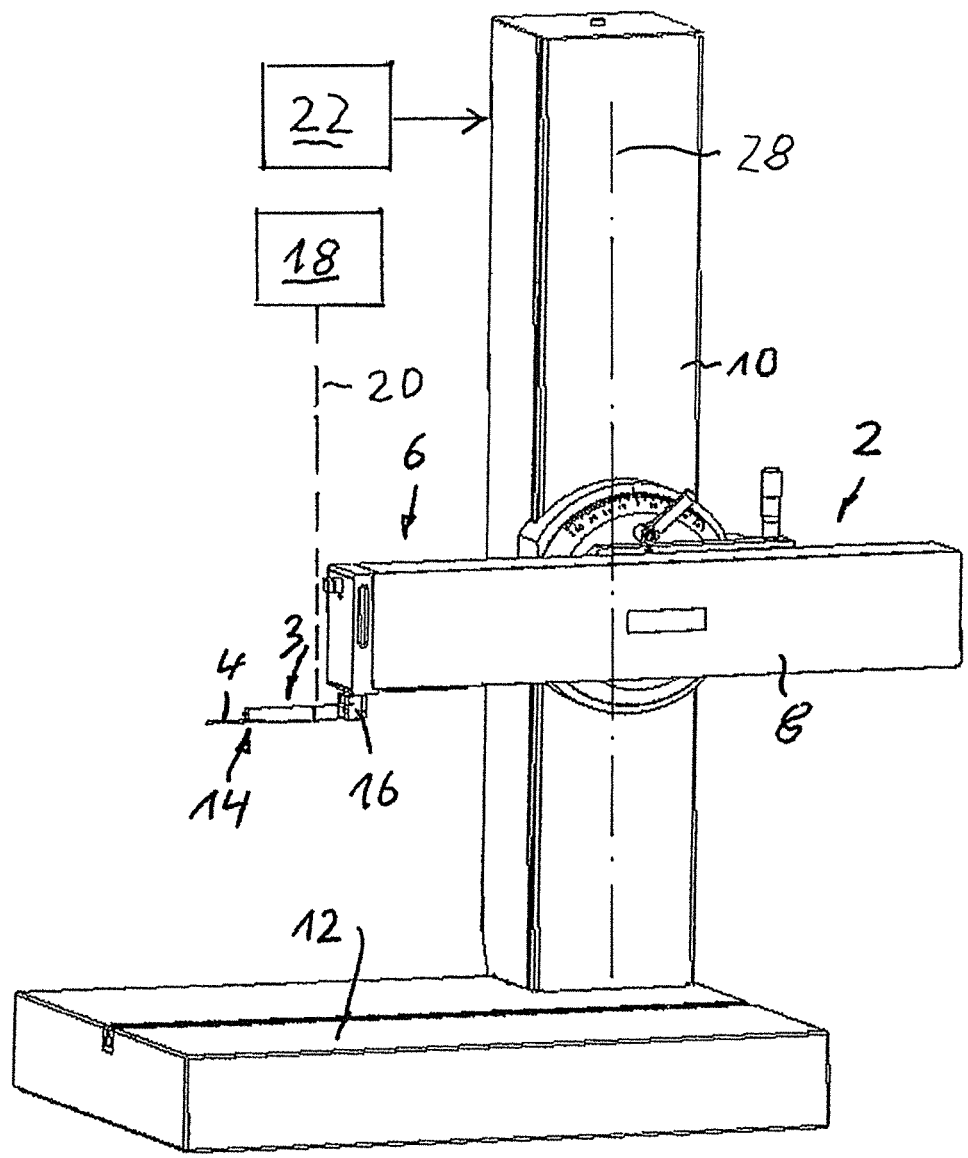
FIG. 1 shows a perspective view of one embodiment of a surface measuring apparatus according to the invention for carrying out one embodiment of a method according to the invention.

FIG. 1 illustrates a measuring station with one embodiment of a surface measuring apparatus 2 according to the invention in the form of a roughness measurement apparatus, having a probe 3 (measuring probe) with a probe arm 4 that bears a probe element, not discernible in FIG. 1, for contacting a surface of a workpiece to be measured. The surface measuring apparatus 2 has a feed apparatus 6 whose stationary base body 8 is situated in a height- and inclination-adjustable manner on a measuring column 10, which is mounted on a base plate 12 (base body). The probe arm 4 is exchangeably connected to a carriage 16 of the feed apparatus 6 via a mechanical interface 14.

During operation of the surface measuring apparatus 2, the carriage 16 of the feed apparatus 6 moves relative to the base body 8 along a linear feed axis, so that a workpiece to be measured may be sampled by means of the probe element mounted on the probe arm 4. The basic design of such a surface measuring apparatus, including a probe and a feed apparatus, is generally known to those skilled in the art, and therefore is not explained in greater detail.

During sampling of the workpiece, the probe 3 outputs probe raw data that represent the surface shape of the workpiece. The probe raw data are evaluated in an evaluation apparatus 18 that is in, or may be brought into, data transmission connection with the probe 3. The evaluation apparatus 18 is illustrated in FIG. 1 in a strictly symbolic manner, and the data transmission connection between the probe 3 and the evaluation apparatus 18 is symbolized by a dashed line 20.

The evaluation apparatus 18 is designed and programmed in such a way that angular deflections of the probe arm during the sampling of the surface of the workpiece are converted into measured values that represent the shape of the surface of the workpiece.

A control apparatus 22 is provided for controlling the measuring operation.

The probe arm 4 is supported on the probe 3 so as to be deflectable by an angle about a swivel axis 24 (see FIG. 2A), and on its end facing away from the swivel axis bears a probe element 26, for example in the form of a probe tip, for sampling the surface of the workpiece, the probe being movable relative to the measuring column along a linear axis, symbolized by a dash-dotted line 28 in FIG. 1. In the illustrated embodiment, the linear axis 28 is the z axis.

The probe arm 4 is exchangeable for adapting to different measuring tasks; the probe arms have different lengths, and a measuring range of the surface measuring apparatus 2 is associated with each probe arm length.

According to the invention, after a probe arm 4 is changed, the associated measuring range of the surface measuring apparatus 2 is automatically adjusted by means of a method according to the invention for operating the surface measuring apparatus 2.

For this purpose, in the illustrated embodiment the control apparatus 22 is designed and programmed in such a way that a) a workpiece is contacted by moving the probe 3 along the linear axis 28 by means of the probe element,
b) after the workpiece is contacted, the probe arm 4 is moved by a specified travel distance along the linear axis 28,
c) the resulting angular deflection of the probe arm 4 about the swivel axis is measured,
d) based on the specified travel distance and the measured angular deflection of the probe arm 4, the probe arm 4 is classified with regard to its length, and
e) a measuring range of the surface measuring apparatus 2 is automatically adjusted according to the classification of the probe arm 4 with regard to its length.

Figure 2B:
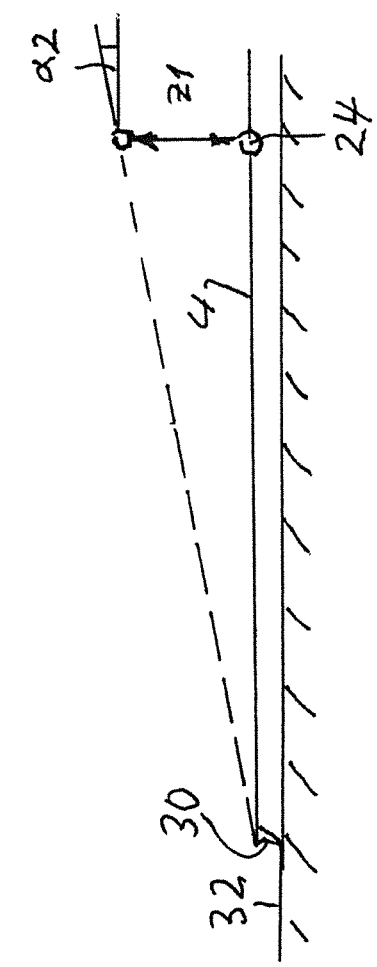
FIGS. 2A and 2B show a schematic diagram for explaining the basic principle of the invention.
Figure 2A:
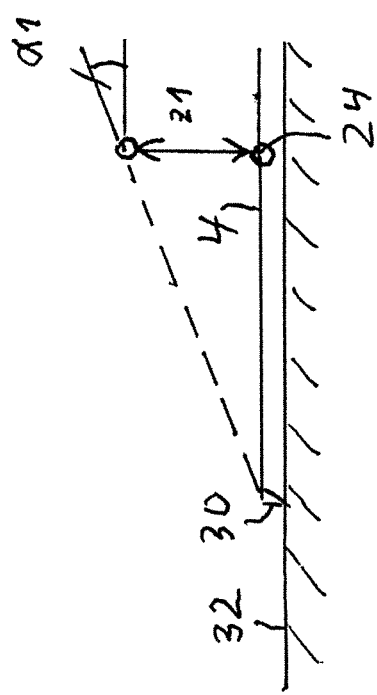

One embodiment of the method according to the invention takes place as follows:

FIG. 2A and FIG. 2B show a schematic diagram for explaining the basic principle of the method according to the invention. In FIG. 2B, for purposes of illustration, a probe arm 4' is depicted whose length is twice the length of a probe arm 4 according to FIG. 2A.

FIGS. 2A and 2B illustrate a probe element 30 that bears the probe arm 4 or 4' on its end facing away from the swivel axis 24.

A workpiece to be measured is symbolically illustrated in FIGS. 4A and 4B and is denoted by reference numeral 32.

For carrying out a measuring operation in which the surface of the workpiece 32 is measured, the workpiece 32 is initially contacted by moving the probe 3 along the linear axis 28 (step a) of the method according to the invention). FIG. 2A illustrates by way of example that the probe element 30 rests against the surface of the workpiece 32, and the probe arm 4 is situated approximately horizontally.

After the workpiece 32 is thus contacted, the probe 3 together with the probe arm 4 is moved along the linear axis 28 (z axis) by a specified travel distance z1, and in particular in the illustrated embodiment in FIG. 2A, upwardly (step b) of the method according to the invention).

The probe element 30 remains in contact with the surface of the workpiece 32, so that the angular deflection of the probe arm 4 about the swivel axis 24 changes. This change in the angular deflection (angle $\alpha 1$ in FIG. 2A) is measured, and recorded by the evaluation apparatus 18 (step c) of the method according to the invention).

In the configuration illustrated in FIG. 2B with a probe arm 4' having twice the length, moving the probe 3 together with the probe arm 4 by the same linear travel distance z1 results in a smaller angular deflection of the probe arm 4 (angle $\alpha 2$ in FIG. 2B).

Thus, since for a specified travel distance along the linear axis 28, the resulting angular deflection of the probe arm 4 or 4' is a direct function of the length of the probe arm 4 or 4', the length of the probe arm 4 or 4' may be deduced directly from the measured angular deflection.

In step d), the probe arm 4 or 4' may thus be classified with regard to its length, based on the specified travel distance and the measured angular deflection of the probe arm 4 or 4'.

In the illustrated embodiment, the evaluation apparatus is designed and programmed in such a way that in step d)
- d1) the length of the probe arm is calculated from the specified travel distance and the measured resulting angular deflection of the probe arm; and
- d2) the classification of the probe arm is made by comparing the calculated length of the probe arm to the lengths of predefined probe arms.

After the probe arm 4 or 4' has been classified by calculating its length and comparing the calculated length to the lengths of predefined probe arms, and has been identified by recognizing its length, the measuring range of the surface measuring apparatus 2 may be correspondingly automatically adjusted.

The invention thus allows, in a particularly simple manner and without additional hardware, automatic recognition of probe arms of different lengths and a corresponding automatic adjustment of the associated measuring range of the surface measuring apparatus 2. Measuring errors resulting from an adjustment of the associated measuring range of the surface measuring apparatus that is not made, or is made incorrectly, after a change of the probe arm are thus reliably avoided.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A method for operating a surface measuring apparatus for measuring a surface of a workpiece, the method comprising:
   a) the surface measuring apparatus is provided, the surface measuring apparatus having a probe that includes a probe arm that is deflectable by an angle about a swivel axis, and that on its end facing away from the swivel axis bears a probe element, the probe being movable relative to a base body of the surface measuring apparatus along a linear axis;
   b) a workpiece is contacted by moving the probe along the linear axis by means of the probe element;
   c) after the workpiece is contacted, the probe arm is moved by a specified travel distance along the linear axis;
   d) the resulting angular deflection of the probe arm about the swivel axis is measured; and
   e) based on the specified travel distance and the measured angular deflection of the probe arm, the probe arm is classified with regard to its length.

2. The method according to claim 1, wherein:
   a) the length of the probe arm is calculated from the specified travel distance and the measured resulting angular deflection of the probe arm; and
   b) the classification of the probe arm is made by comparing the calculated length of the probe arm to the lengths of predefined probe arms.

3. The method according to claim 1, wherein:
   a) a measuring range of the surface measuring apparatus is automatically adjusted according to the classification of the probe arm with regard to its length.

4. The method according to claim 1, wherein:
   a) the surface measuring apparatus is a roughness measurement apparatus, a contour measurement apparatus, or a shape measurement apparatus.

5. The method according to claim 1, wherein:
   a) the linear axis is a vertical or horizontal axis.

6. The method according to claim 1, wherein:
   a) the linear axis is defined by a measuring column of the surface measuring apparatus.

7. The method according to claim 1, wherein:
   a) the probe is a tactile probe.

8. The method according to claim 1, wherein:
   a) the probe is connected to the base body of the surface measuring apparatus by a feed apparatus, and the feed apparatus defines a linear feed axis, wherein an inclination of the linear feed axis relative to the horizontal is determined and is included in the classification of the probe arm with regard to its length.

9. The method according to claim 1, wherein:
   a) a distance measuring system is associated with the linear axis.

10. A surface measuring apparatus for measuring a surface of a workpiece during a measuring operation, comprising:
    a) a base body;
    b) a probe that includes a probe arm that is deflectable by an angle about a swivel axis, and that on its end facing away from the swivel axis bears a probe element for sampling the surface of the workpiece, the probe being movable relative to the base body along a linear axis;
    c) an evaluation apparatus that is designed and programmed in such a way that angular deflections of the probe arm while sampling the surface of the workpiece are converted into measured values that represent the shape of the surface of the workpiece;
    d) a control apparatus for controlling the measuring operation;
    e) the control apparatus is designed and programmed in such a way that a workpiece is contacted by moving the probe along the linear axis by the probe element;
    f) after the workpiece is contacted, the probe together with the probe arm is moved by a specified travel distance along the linear axis;
    g) the resulting angular deflection of the probe arm about the swivel axis is measured; and
    h) based on the specified travel distance and the measured angular deflection of the probe arm, the probe arm is classified with regard to its length.

11. The surface measuring apparatus according to claim 10, wherein:
    a) the evaluation apparatus is designed and programmed in such a way the length of the probe arm is calculated from the specified travel distance and the measured resulting angular deflection of the probe arm; and
    b) the classification of the probe arm is made by comparing the calculated length of the probe arm to the lengths of predefined probe arms.

12. The surface measuring apparatus according to claim 10, wherein:
    a) the control apparatus is designed and programmed in such a way that a measuring range of the surface measuring apparatus is automatically adjusted according to the classification of the probe arm with regard to its length.

13. The surface measuring apparatus according to claim 10, wherein:
a) the surface measuring apparatus is a roughness measurement apparatus, a contour measurement apparatus, or a shape measurement apparatus.

14. The surface measuring apparatus according to claim 10, wherein:
a) the linear axis is a vertical or horizontal axis.

15. The surface measuring apparatus according to claim 10, wherein:
a) the linear axis is defined by a measuring column of the surface measuring apparatus.

16. The surface measuring apparatus according to claim 10, wherein:
a) the probe is a tactile probe.

17. The surface measuring apparatus according to claim 10, wherein:
a) the probe is connected to the base body of the surface measuring apparatus by means of a feed apparatus, and the feed apparatus defines a linear feed axis, wherein an inclination of the linear feed axis relative to the horizontal is determined and is included in the classification of the probe arm with regard to its length.

18. The surface measuring apparatus according to claim 10, wherein:
a) the surface measuring apparatus has a distance measuring system that is associated with the linear axis.

* * * * *